(12) United States Patent
Morgan

(10) Patent No.: US 7,598,881 B2
(45) Date of Patent: Oct. 6, 2009

(54) SENSOR AND CIRCUIT CONFIGURATION FOR OCCUPANT DETECTION

(75) Inventor: Kelvin L. Morgan, Atlanta, GA (US)

(73) Assignee: Elesys North America, Inc., Suwanee, GA (US)

( * ) Notice: Subject to any disclaimer, the term of this patent is extended or adjusted under 35 U.S.C. 154(b) by 294 days.

(21) Appl. No.: 11/583,652

(22) Filed: Oct. 18, 2006

(65) Prior Publication Data

US 2008/0094213 A1    Apr. 24, 2008

(51) Int. Cl.
*G08B 21/00* (2006.01)
(52) U.S. Cl. .................. 340/667; 340/426.26; 340/540; 340/552; 340/561; 340/562; 280/730.2; 280/735; 438/127; 297/217.1; 297/217.2; 297/217.3
(58) Field of Classification Search .......... 340/667, 340/668, 438, 541, 501, 561, 562, 573.1, 340/426.24, 426.26, 425.5, 552, 687; 280/735, 280/730.2; 438/127; 180/272, 273, 274, 180/862.472; 701/45, 46, 47; 324/207.11, 324/609, 207.13, 207.14, 207.15, 207.16; 73/862.472; 297/216.1, 217.2, 217.3
See application file for complete search history.

(56) References Cited

U.S. PATENT DOCUMENTS

| | | | |
|---|---|---|---|
| 3,740,567 A * | 6/1973 | Atkins | 340/573.1 |
| 5,406,627 A | 4/1995 | Thompson et al. | |
| 5,712,621 A * | 1/1998 | Andersen | 340/547 |
| 5,948,031 A | 9/1999 | Jinno et al. | |
| 6,142,513 A | 11/2000 | Schoos et al. | |
| 6,161,070 A | 12/2000 | Jinno et al. | |
| 6,329,913 B1 | 12/2001 | Shieh et al. | |
| 6,329,914 B1 | 12/2001 | Shieh et al. | |
| 6,356,194 B1 * | 3/2002 | Fukui et al. | 340/561 |
| 6,412,357 B2 | 7/2002 | Billen | |
| 6,684,973 B2 * | 2/2004 | Baba et al. | 180/273 |
| 6,696,948 B2 | 2/2004 | Thompson et al. | |
| 6,707,306 B1 | 3/2004 | Wendt | |
| 6,737,953 B2 | 5/2004 | Serban et al. | |
| 6,794,590 B2 | 9/2004 | Federspiel | |
| 6,816,077 B1 | 11/2004 | Shieh et al. | |
| 6,906,293 B2 | 6/2005 | Schmiz et al. | |
| 6,937,142 B2 | 8/2005 | Theiss et al. | |
| 6,977,592 B2 | 12/2005 | Orlewski | |
| 2001/0003049 A1 * | 6/2001 | Fukasawa et al. | 438/127 |
| 2004/0041377 A1 * | 3/2004 | Kumakiri et al. | 280/730.2 |

(Continued)

OTHER PUBLICATIONS

U.S. Appl. No. 11/404,569, filed Apr. 13, 2006, Kelvin Morgan.

*Primary Examiner*—Benjamin C Lee
*Assistant Examiner*—Sisay Yacob
(74) *Attorney, Agent, or Firm*—Brinks, Hofer, Gilson & Lione

(57) ABSTRACT

In occupant detection systems, direct connections, such as fixed or permanent connections, are provided between the antenna and measurement circuit and between the measurement circuit and wiring harness. Multiple such arrangements may be used for capacitive, electric field, or other types of occupant detection circuits. In some embodiments, the occupant detection is split between a measurement circuit and a processor. For multiple sensors, multiple measurements circuits are provided with direction connections. The processor determines the occupancy state from data from the measurement circuits. The direction connections provide separate, unitary measurement modules to be used by the occupancy system.

16 Claims, 2 Drawing Sheets

U.S. PATENT DOCUMENTS

2006/0209050 A1  9/2006  Serbian
2006/0220657 A1* 10/2006 Mitchell et al. ............. 324/609
2006/0222207 A1  10/2006  Balzer et al.

* cited by examiner

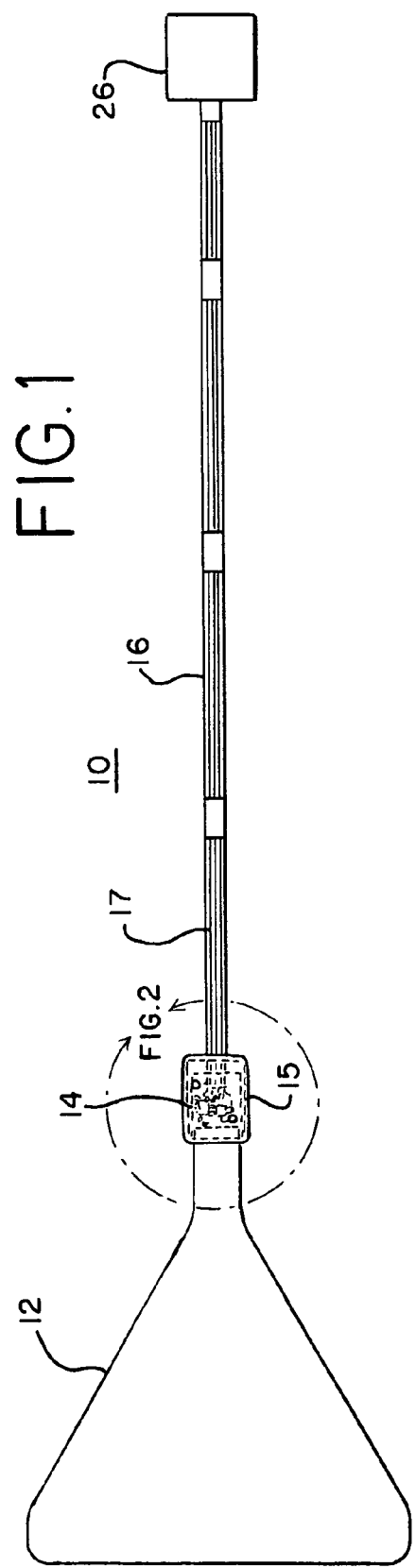
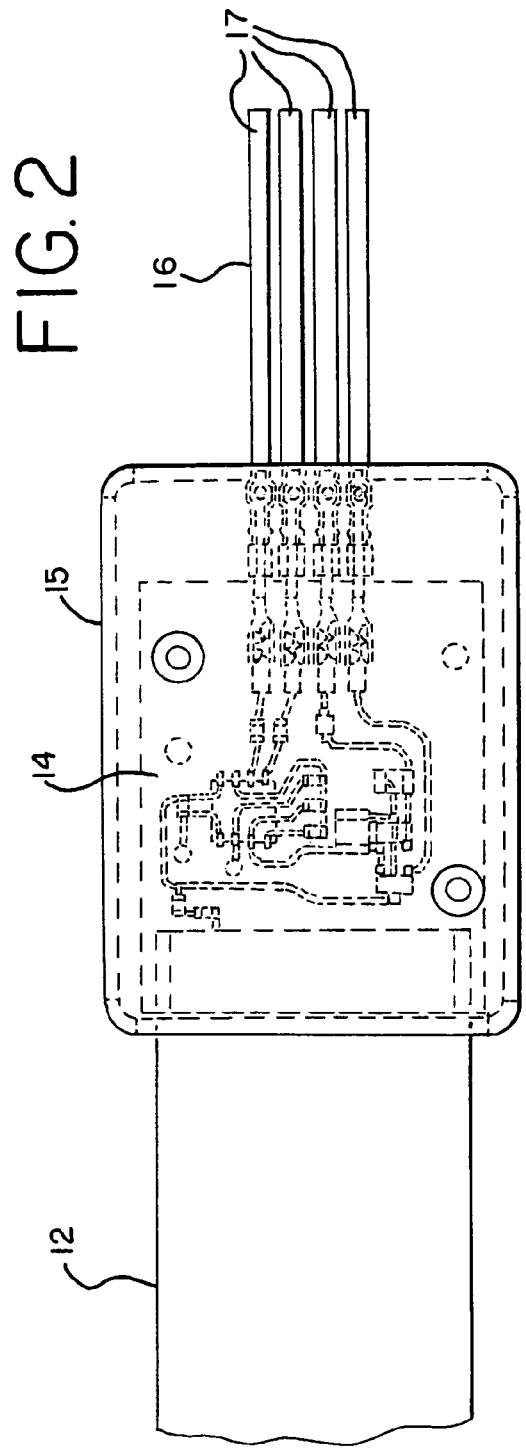

SENSOR AND CIRCUIT CONFIGURATION FOR OCCUPANT DETECTION

BACKGROUND

The present invention relates to occupant detection. In particular, a sensor and circuit configuration is provided.

Occupant detection in conjunction with sensing a crash determines whether to activate an airbag. Various occupant detection systems have been proposed, including detection based on ultrasound, infrared, radar, electric field, capacitance, weight, optical, or combinations thereof. The occupant detection systems use antennas positioned in various locations within a vehicle, such as within a windshield, within a roof liner, in floor mats, or within a seat. The antennas are piezoelectric material, conductive materials, or other structures. For example, a conductive textile or flexible metallic electrode within a seat allows capacitive or electric field-based detection of an occupant. As another example, strain gauges or pressure sensing sensors on flexible circuit material within a base portion of the seat detect an occupant.

Typically, an array of antennas connects with an electronic control unit. The connections between the antennas and the electronic control unit may use releasable connectors, but compliant pins or other connectors may be used. The electronic control unit measures signals and determines the occupancy state of the seat or vehicle. The electronic control unit outputs the state information to an air bag controller. The air bag controller connects with the occupancy detection electronic control unit and a crash sensor. The air bag controller activates or does not activate the deployment of the air bag during a crash depending on the occupancy state.

BRIEF SUMMARY

By way of introduction, the preferred embodiments described below include methods, sensors and systems for occupant detection or configuration of occupant detection systems. Direct connections, such as fixed or permanent connections, are provided between the antenna and a measurement circuit and between the measurement circuit and a wiring harness. Multiple such arrangements may be used for capacitive, electric field, or other types of occupant detection circuits. In some embodiments, the occupant detection is split between a measurement circuit and a processor. For multiple sensors, multiple measurements circuits are provided with direct connections. The processor determines the occupancy state from data from the measurement circuits. The direct connections provide separate, unitary measurement modules to be used by the occupancy system. Any one or more of the features discussed in this paragraph may be used alone or in combination.

In a first aspect, a sensor system is provided for occupant detection. A first circuit on a circuit substrate separate from an antenna connects with the antenna. The first circuit is operable to measure occupant information by electrical connection with the antenna. The antenna physically connects to the circuit substrate by a first permanent connection. At least one wire connects with the first circuit. The at least one wire physically connects to the circuit substrate by a second permanent connection. A processor is operable to determine a characteristic of an occupant as a function of the occupant information. The processor electrically connects with the first circuit by the at least one wire. The processor is spaced from the first circuit by the at least one wire.

In a second aspect, a sensor system is provided for occupant detection. A circuit substrate has a first circuit electrically connected with an antenna. The first circuit is operable to measure occupant information using the antenna. The circuit substrate has a first physical connection with the antenna. The first physical connection is a first fixed connection. A wire harness electrically connects with the first circuit. The wire harness has a second physical connection with the circuit substrate. The second physical connection is a second fixed connection.

In a third aspect, a method is provided for configuring a sensor for occupant detection. An antenna is nonreleasably connected with a circuit. The circuit is operable to measure electric field, capacitive, or both electric field and capacitive effects of an occupant with the antenna. The circuit is nonreleasably connected with a wiring harness. Low-pressure molding is performed over the nonreleasable connections.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a diagram of one embodiment of a sensor system for occupant detection;

FIG. 2 is an expanded view of a portion of the sensor system of FIG. 1;

DETAILED DESCRIPTION OF THE DRAWINGS AND PRESENTLY PREFERRED EMBODIMENTS

Figure 3:
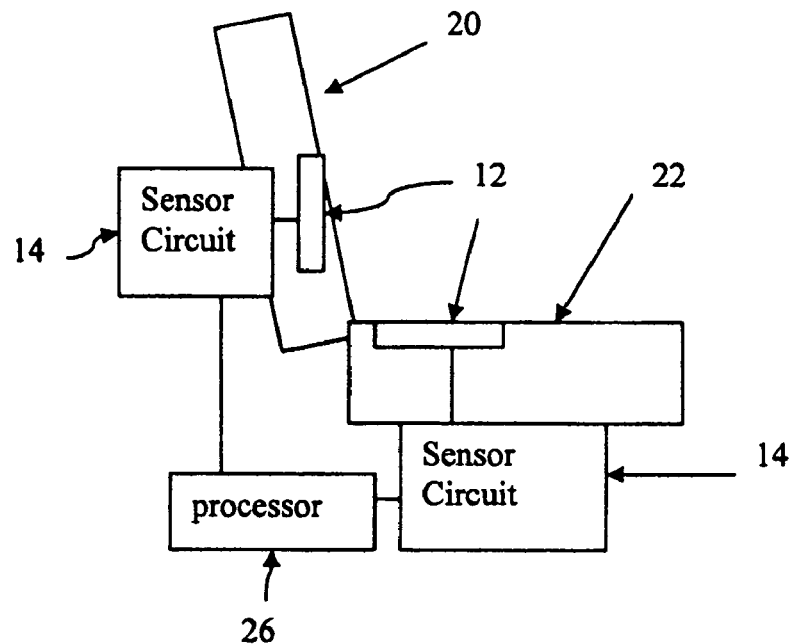
FIG. 3 is a graphical representation of one embodiment of a vehicle seat with an occupant sensor.

An antenna attaches to a substrate that houses electronics of the occupant detection system. The attachment is fixed. A wiring harness attaches to the substrate. The attachment is fixed. The space, manufacturing, and cost associated with releasable connectors may be avoided. The fixed attachments still allow for modular design. The wiring harness connects the electronics to a processor. Wiring harnesses from different electronics modules and associated antennas connect with the processor as modules. The processor determines the occupancy state based on measurements by the modules.

FIG. 1 shows a sensor system 10 for occupant detection. The sensor system is a part of or the entire occupant detection system for a seat or other location. The sensor system 10 includes an antenna 12, a circuit 14, a wiring harness 16, and a processor 26. Additional, different, or fewer components may be provided. For example, the processor 26 is not provided. As another example, additional antennas 12 and/or circuits 14 connect with the wiring harness 16.

The antenna 12 is an electrode, loop conductor, patterned conductor, linear conductor, or other now known or later developed antenna. The antenna 12 is for use with capacitance or electric field or capacitance based sensing, but weight or other sensors may be used. The antenna 12 is copper, conductive electrodes, strain gauges, pressure sensors, radio frequency antennas, piezoelectric films, semiconductor film based diodes or light detectors, combinations thereof or other now known or later developed sensors for detecting a presence or characteristic of an occupant. Single layer or multiple layer antennas may be used. In one embodiment, the antenna 12 is a single loop or plate antenna, but nested or separate transmit and receive antennas may be used. The antenna 12 has any shape, such as the triangular shape shown in FIG. 1. Any now known or later developed antenna 12 material, shape, structure, support, or substrate may be used.

The antenna 12 is a conductor in one embodiment. The conductor may be self-supported or include a substrate. In one embodiment, the antenna 12 is a conductive cloth, such as nickel carbon conductive cloth. In another embodiment, the antenna 12 is formed on a substrate, such as an electrode formed on flexible circuit material (e.g., Kapton,® polyimide film, PET polyester (Mylar®) film, PEN polyethylene napthalate or other now known or later developed flexible materials for use as a flexible circuit substrate). The flexible circuit material may have active or passive electrical circuit components integrated on the material, or the flexible film is free of active and/passive components. One or more antenna 12 associated signal traces may be formed on the flexible film material. The signal traces connect the antenna 12 with the sensor circuit 14. The traces are of a same or different material as the antenna 12, such as both being deposited, etched or form rolled annealed copper or other flexible metallic or conductive material. No trace is provided in other embodiments.

The antenna substrate includes a tail or no tail. The tail is of any length, such as from a few inches to a yard. When the antenna 12 is within the seat 20 (see FIG. 3), the tail may extend from the antenna 12 to the circuit 14 at a different location. Alternatively, the circuit 14 is positioned adjacent to the antenna 12 in the seat.

The flexible film is a solid material, but may include apertures in sections apart from or including the antenna 12. For example, one or more apertures allow for greater flexibility, airflow, water drainage, noise reduction, or may be provided for other purposes. (Publication No. 2007/0241895 (Ser. No. 11/404,569)), the disclosure of which is incorporated herein by reference, shows apertures for noise reduction.

Additional components may form on or connect to the flexible material of the antenna substrate or the circuit 14. For example, a temperature, humidity or both temperature and humidity sensor connect with the flexible material or are integrated as part of the sensor circuits 14. In one embodiment, one of the additional sensors disclosed in U.S. Pat. No. 6,816,077 is provided.

The antenna 12 is for an occupant space. For example, the antenna 12 is positioned in a window, on a steering wheel, on a dashboard, in a seat, on a seat back, in a seat base, in a seat support structure, on a floor, or other location in a vehicle. A same antenna 12 may extend into multiple of these locations, or multiple antennas 12 may be provided for different locations. In one embodiment, an antenna 12 is positioned in a seat base or a seat back on a surface adjacent the occupant space, such as beneath the fabric at a location likely positioned by the buttocks or lower back of a normally seated adult occupant. For example, the antenna 12 is on or in a base portion of a vehicle seat adjacent the occupant space and adjacent to a back of the vehicle seat. FIG. 3 shows one such example of an antenna 12 in a seat base. The seat is a passenger, driver, bench, bucket or other seat of a vehicle. Seats in other settings, such as seats at a movie theater, may be used. In the example of FIG. 3, an additional antenna 12 is positioned in the back portion of the seat.

The circuit 14 electrically connects with the antenna 12. The traces or conductor of the antenna 12 connect with the circuit 14. Contact pads, bump soldering, pins, or other structure provide electrical contact.

The circuit 14 is operable to measure occupant information by electrical connection with or by using the antenna 12. For example, the circuit measures a voltage, current, impedance, capacitance, resistance, frequency, or other characteristic. The measurement is a loading measurement, such as measuring a current draw when transmitting an alternating signal from the antenna 12. Charge or discharge characteristics may be measured. Alternatively, a received signal is measured. In one embodiment, the circuit 14 measures for an electric field sensor, capacitive sensor, or combinations thereof.

Any measurement circuit may be used, such as amplifiers, bridges, voltage dividers, matched capacitors, or comparators. In one embodiment, the circuit 14 is a voltage or current source connected with the antenna 12. A waveform generator, such as a transistor or switch with a power source, digital-to-analog converter, or other now known or later developed device applies a change in voltage or current to the antenna 12. In one embodiment, the circuit 14 is a transistor for generating a unipolar square wave between 0 and 5 volts. Greater or lesser amplitude, and/or non-square waves (e.g., sinusoidal) may be used. An analog-to-digital converter and a processor or other now known or later developed voltage or current measurement circuit measure the charge on the antenna 12. In one embodiment, the circuit 14 is a microcontroller also used for the applying a voltage step. For example, the circuit 14 has an analog-to-digital converter (ADC) channel, an internal oscillator, and low power consumption. The circuit may be powered from a RS232 serial port or other port. The output drive capability of the microcontroller is sufficient to provide a charging pulse to a capacitive load. For the ADC, the reference used is an external voltage supply sourced by a linear regulator. Other microcontrollers may be used with the same or different characteristics. Alternatively, separate devices are provided. For example, an external oscillator is provided. As another example, an external voltage source is the ADC reference.

The circuit 14 obtains information about the contents of the seat. The circuit 14 does not determine the contents of the seat. For example, the measurement values are transmitted to another circuit, such as an electronic control processor, to determine the occupancy state. Alternatively, the circuit 14 includes a processor or other circuits for determining the occupancy state from the measurements.

The circuit 14 includes a circuit substrate 15. The circuit substrate 15 is circuit board material, flexible circuit material, or other now known or later developed substrate for flex circuit, conductive ink circuit, or printed circuit board circuit. The components of the circuit 14 are printed, patterned, surface mounted, flip chip mounted or otherwise connected with the circuit substrate 15.

The circuit substrate 15 is separate from the antenna 12 or substrate of the antenna 12. For example, different materials are used. As another example, the same material is used, but separate pieces are used. In alternative embodiments, the circuit substrate 15 and the antenna substrate are a unitary piece.

The antenna 12 physically connects to the circuit substrate 15. The conductive antenna material or the substrate of the antenna 12 connects to the circuit substrate 15. The connection is permanent or fixed. Rather than a releasable connection, the connection is formed or made to be non-releasable without destruction. Destruction includes rendering a component inoperable or includes an operable component, but with a bond or other connector being destroyed. For example, the antenna 12 connects to the circuit substrate 15 by an adhesive, solder, rivet, combinations thereof, or other connection. Alternatively, releasable connections, such as plastic clips or connectors, are used.

The type of connection may depend on the materials being joined. For joining flex circuit material to flex circuit material, an adhesive bond may be used. For flex circuit or conductive cloth material to printed circuit board material, adhesive, riveting, or soldering may be used. Other types of connections may be used in these examples or other embodiments.

The wiring harness 16 includes a plurality of wires 17. In other embodiments, a single wire 17 is provided. The wires 17 may be separately insulated or within a ribbon. The wires 17 may be bundled, enclosed, or independent of each other. Alternatively, the wiring harness 16 is formed by conductors or signal traces on a substrate.

The ends of the wires 17 and wiring harness 16 include terminals, exposed conductors, and/or connectors. For example, one end of the wiring harness 16 includes a releasable connector for connection with the processor 26. The other end of the wiring harness 16 includes crimp connectors, solderable wire or pads, or other terminals for electrical and/or physical connection. The wiring harness 16 is a separate piece than the circuit substrate 15, but may be a unitary or singular piece with the circuit substrate 15.

The wires 17 electrically connect with the circuit 14. The wiring harness 16 allows data or signal communication with the processor 26. In one embodiment, buss communications are provided. In other embodiments, particular signals or information are provided on particular wires 17 for communication with the processor 26.

The wires 17 and wiring harness 16 separate the processor 26 from the circuit 14. Any length of wires 17 may be used, such as about 50 centimeters.

The wiring harness 16 physically connects to the circuit substrate 15 or circuit 14. The connection is permanent or fixed. Rather than a releasable connection, the connection is formed or made to be non-releasable without destruction. Destruction includes rendering a component inoperable or includes an operable component, but with a bond or other connector being destroyed. For example, the wires 17 connect to plated crimp terminals or crimp connector on the circuit substrate 15. The connection is formed by crimping. Other types of connections may be used, such as adhesive, solder, rivet, or combinations thereof. Alternatively, releasable connections, such as plastic clips or connectors, are used.

The connection may be with the circuit substrate 15. For example, a substrate, connector, terminal or other portion of the wiring harness 16 and/or wires 17 is riveted, soldered, bonded or otherwise connected with the circuit substrate 15. Both wire and substrate connection may be used.

The connections and/or the circuit 14 are encapsulated. For example, the connections and circuit 14 are potted. As another example, encapsulate material is deposited by low-pressure molding. The encapsulate material covers the connections, providing strain relief. The circuit substrate 15 may include holes or other structure for maintaining the encapsulate material in position. Alternatively or additionally, a housing or other structure encloses the circuit 14 and/or connections. In other embodiments, the circuit 14 and/or connections are free of covering.

The processor 26 is another circuit. The other circuit may include a general processor, digital signal processor, application specific integrated circuit, field programmable gate array, digital circuit, analog circuit, amplifier, filter, combinations thereof, or other now known or later developed device for determining occupancy or occupant characteristic as a function of one or more measured signals. The processor 26 may distinguish between occupants and inanimate objects, and/or between empty and occupied. The occupant sensor may distinguish between other classifications, such as between occupants of at least two different sizes. Distinctions in position, height, posture, weight, head location, motion, or other characteristics of an occupant may be used additionally or alternatively.

The circuit 14 performs the measurement and/or signal conditioning. The processor 26 determines occupancy state from the output occupant information measured or conditioned by the circuit 14. Other divisions between the circuit 14 and the processor 26 may be used. The circuit 14 and processor 26 operate together to determine occupancy state using any now known or later developed techniques. For example, the occupant sensor uses pattern recognition or other processes for optical, acoustic or infrared sensing. In another example, one of the occupant detection circuits disclosed in U.S. Pat. Nos. 5,406,627, 5,948,031, 6,161,070, 6,329,913, 6,329,914, 6,816,077, and 6,696,948, the disclosures of which are incorporated herein by reference, is used. The effect of an occupant on an electric field is used to determine the presence or other characteristic of an occupant, such as a human or an inanimate occupant. The loading current or other values associated with the transmission of radio frequency waves are used to determine the occupant information. As another example, charge and/or discharge timing or other characteristic are used to determine occupancy. Other electric field or capacitive sensing circuits may be used, such as a circuit for determining a capacitance, a frequency change, current level, voltage level or other characteristic of an occupant effect on an electric field or a capacitance value.

The processor 26 connects with the wiring harness 16. The connection is fixed or releasable. For example, a crimp connector on the wiring harness 16 is crimped with pins on a board for the processor 26. As another example, a connector clips onto or into a housing connector for the processor 26. The wiring harness 16 may connect with a buss controller where the processor 26 connects with the buss controller. The electrical connection with the wiring harness 16 allows the circuit 14 to be spaced from the processor 26.

The processor 26 outputs the occupancy state information to a separate air bag controller. The communication with the air bag controller allows for enable and disable override of air bag activation based on occupancy state. Alternatively, the processor 26 is part of the air bag controller.

The division between the circuit 14 and the processor 26 allows for modular inputs to the processor 26. For example, FIG. 3 shows two antennas 12 and associated circuits 14. Both circuits 14 connect with the processor 26. The antennas 12 are shown in the seat base 22 and back 20 portions, but may be placed in different locations. Only one or more than two antennas 12 and circuits 14 may be used.

Both circuits 14 measure occupant information by electrical connection with the respective antennas 12. Different wiring harnesses 16 connect the circuits 14 to the processor 26. Alternatively, a single wiring harness 16 distributed to both circuits 14 connects the circuits 14 to the processor 26. The processor 26 determines the presence or other characteristic of an occupant as a function of the occupant information from both circuits 14.

Figure 4:
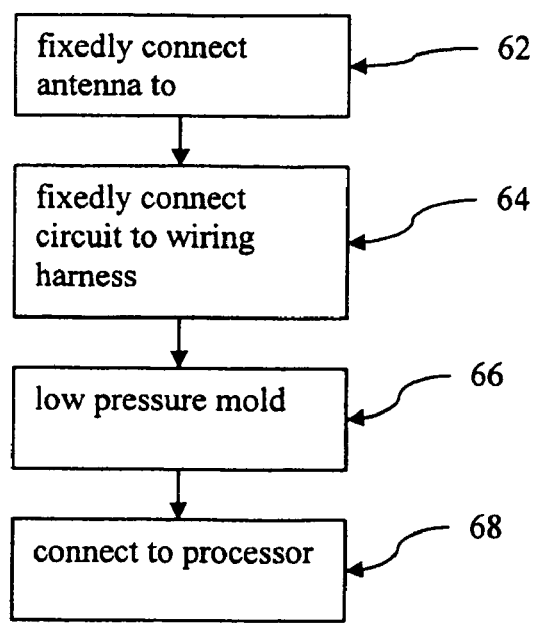
FIG. 4 is a flow chart diagram of one embodiment of a method for configuring a sensor for occupant detection.

FIG. 4 shows a method for configuring a sensor for occupant detection. Additional, different or fewer acts may be used. The acts are performed in the order shown or a different order.

In act 62, an antenna is connected with a circuit. The connection is nonreleasable. For example, the antenna or antenna substrate is bonded, riveted, crimped, or soldered to the circuit substrate. The antenna is fixedly or permanently attached. In one embodiment, the antenna includes a pre-applied adhesive. A covering is removed from the pre-applied adhesive. The circuit includes a conductive pad or pads. The adhesive region of the antenna is placed on the conductive pad or pads. The adhesive is conductive. Both physical and electrical connection is formed by the conductive adhesive. The connection is nonreleasable. Sufficient force may separate the antenna from the circuit, and sufficient adhesive may remain for reattachment, but the connection is nonreleasable, fixed, or permanent due to degradation caused by removal.

The circuit, once connected with the antenna, is operable to measure electric field, capacitive, or both electric field and capacitive effects of an occupant with the antenna. The measurement may be tested during assembly or after placement in a vehicle.

In act 64, the wiring harness is connected with the circuit. The connection is nonreleasable. For example, the wires, insulation, substrate, support or other wiring harness material is soldered, bonded, crimped, riveted, or combinations thereof to the circuit or circuit substrate. The wiring harness is fixedly or permanently attached. In one embodiment, terminals on the wires of the wiring harness crimp onto pins or other structure of the circuit. Sufficient force may separate the wiring harness from the circuit, but the connection is nonreleasable, fixed, or permanent due to degradation caused by the removal. Subsequent replacement may not hold with sufficient force or require tools.

In act 66, the connections formed in acts 62 and 64 are encapsulated. Low-pressure molding deposits material over the connections and circuit. Low-pressure molding may provide strain relief for the connections and protect the circuit. Other deposition techniques may be used, such as potting.

In act 68, the wiring harness is connected to a processor or other wiring. In one embodiment, the connection is releasable, such as with a clip or screw type connector. In other embodiments, a nonreleasable connection is used.

The processor may be connected with an air bag controller for or during installation in a vehicle. The modular antenna and measurement circuits are installed in a vehicle. The connections with the processor are then formed.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A sensor system for occupant detection, the sensor system comprising:
    a flexible circuit material comprising an electrical insulating material;
    an antenna supported by the flexible circuit material, the antenna adjacent to an occupant seating area;
    a circuit substrate physically connected to the flexible circuit material by a first permanent connection;
    a first circuit on the circuit substrate separate from the antenna, the first circuit operable to measure occupant information by electrical connection with the antenna and spaced from the occupant seating area, the antenna physically connected to the circuit substrate by a first permanent connection, the first circuit configured to output the measured occupant information free of determination of any characteristic of an occupant;
    at least one wire electrically connected with the first circuit, the at least one wire physically connected to the circuit substrate by a second permanent connection; and
    a processor operable to determine a characteristic of the occupant as a function of the occupant information output free of determination of any characteristic, the processor electrically connected with the first circuit by the at least one wire, the processor spaced from the first circuit by the at least one wire and spaced from the occupant seating area.

2. The system of claim 1 wherein the at least one wire releasably connects with the processor.

3. The system of claim 1 further comprising:
    a second circuit connected with another antenna, the second circuit operable to measure other occupant information by electrical connection with the other antenna; and
    at least another wire connected with the second circuit and the processor;
    wherein the processor is operable to determine the characteristic of the occupant as a function of the occupant information and the other occupant information.

4. A sensor system for occupant detection, the sensor system comprising:
    a flexible circuit material comprising an electrical insulating material;
    an antenna supported by the flexible circuit material, the antenna adjacent to an occupant seating area;
    a circuit substrate, spaced from the occupant seating area having a first circuit electrically connected with the antenna, the first circuit operable to measure occupant information using the antenna, the circuit substrate having a first physical connection with the flexible circuit material antenna, the first physical connection being a first fixed connection, the circuit substrate comprising circuit board material where the first circuit comprises a printed circuit board circuit;
    a wire harness electrically connected with the first circuit, the wire harness having a second physical connection with the circuit substrate, the second physical connection being a second fixed connection; and a processor operable to detect an occupant as a function of the occupant information output by the first circuit, the processor spaced from the occupant seating area.

5. The system of claim 4 wherein the first physical connection is an adhesive connection, solder connection, rivet connection, or combinations thereof.

6. The system of claim 4 wherein the second physical connection is a crimp connection, a solder connection, or combinations thereof.

7. The system of claim 4 wherein the antenna comprises a conductor on flexible circuit material, the wiring harness comprises a plurality of wires, the first physical connection comprises an adhesive connection, and the second physical connection comprises a crimp connection.

8. The system of claim 4 wherein the first and second fixed connections are nonreleasable without destruction.

9. The system of claim 4 wherein the circuit substrate comprises flexible circuit material, the first fixed connection comprising an adhesive bond.

10. The system of claim 4 further comprising:
    low pressure molded encapsulate material covering the first and second physical connections.

11. The system of claim 4 wherein the first circuit comprises an electric field sensor, capacitive sensor, or combinations thereof.

12. The system of claim 4 further comprising a second circuit connected with the wiring harness spaced away from the first circuit, the second circuit operable to determine a characteristic of an occupant from the occupant information measured by the first circuit.

13. The system of claim 12 wherein the second circuit comprises an occupant detection processor operable to communicate with an air bag controller.

14. A method for configuring a sensor for occupant detection, the method comprising:

forming an antenna on a flexible circuit material, the flexible material comprising an electrical insulating material; positioning the antenna near an occupant seating area;

nonreleasably connecting the flexible circuit material with a substrate; positioning the substrate away from the occupant seating area;

electrically connecting the antenna with a circuit on the substrate, the circuit operable to measure electric field, capacitive, or both electric field and capacitive effects of an occupant with the antenna;

nonreleasably connecting the circuit with a wiring harness; applying low-pressure molding over the nonreleasable connections; releasably connecting the wiring harness to an occupant detection processor; and determining, occupant detection by the processor spaced from the occupant seating area, a characteristic of an occupant with the occupant detection processor from measurements output by the circuit, the measurements being free of any characterization of the occupant.

15. The method of claim 14 wherein nonreleasably connecting comprises soldering, bonding, crimping, riveting, or combinations thereof.

16. The method of claim 14 wherein nonreleasably connecting comprises permanently connecting.

* * * * *